United States Patent [19]
Strauss et al.

[11] 3,945,278
[45] Mar. 23, 1976

[54] APPARATUS FOR MAKING RELIEF CUTS ON PREVIOUSLY SCORED GLASS SHEETS

[76] Inventors: Gottfried Strauss, Durer-Strasse 24, Heiligenhaus, Germany; Kurt Klotzbach, A-9210 Portschach, a.Ws., Sekull, Austria

[22] Filed: Apr. 23, 1975

[21] Appl. No.: 570,817

[30] Foreign Application Priority Data
Apr. 25, 1974 Germany............................ 2419998

[52] U.S. Cl. ........................ 83/12; 83/169; 83/487; 83/588; 83/639; 83/859
[51] Int. Cl.² ..................... B26D 3/08; C03B 33/02
[58] Field of Search ......... 83/12, 8, 11, 6, 169, 487, 83/588, 639, 859, 614; 225/2, 96, 96.5

[56] References Cited
UNITED STATES PATENTS

| | | | |
|---|---|---|---|
| 3,198,044 | 8/1965 | Clin | 83/12 X |
| 3,800,639 | 4/1974 | Restel | 83/12 X |
| 3,850,063 | 11/1974 | Witkoski | 83/12 |

*Primary Examiner*—Frank T. Yost

[57] ABSTRACT

An apparatus for making relief cuts on prescored glass sheets is disclosed, having an elongated beam extending above the previously scored glass pane; a horizontal, pressure medium operated cylinder and piston unit disposed on the beam and extending substantially over the entire length thereof to advance the cutting wheel to a starting position adjacent the previously scored outer contour of the pane, and then to effect the relief cut; a cutting head which bears the cutting wheel and can be displaced horizontally by the horizontal cylinder and piston unit; a vertical, pressure medium operated cylinder and piston unit disposed in the cutting head for raising and lowering the cutting wheel out of and into its working position, and a control system for the controlled, automatic operation of the cylinder and piston units.

12 Claims, 6 Drawing Figures

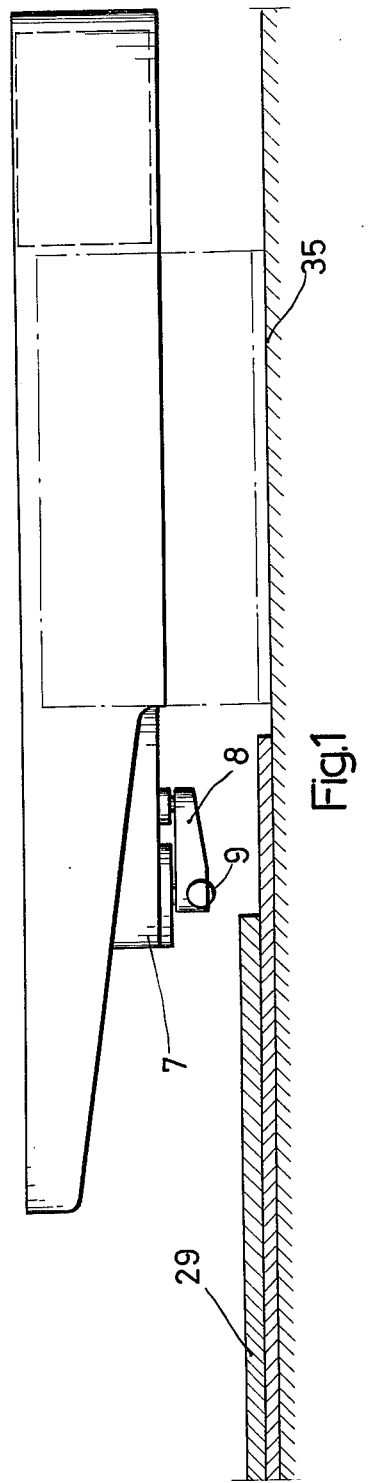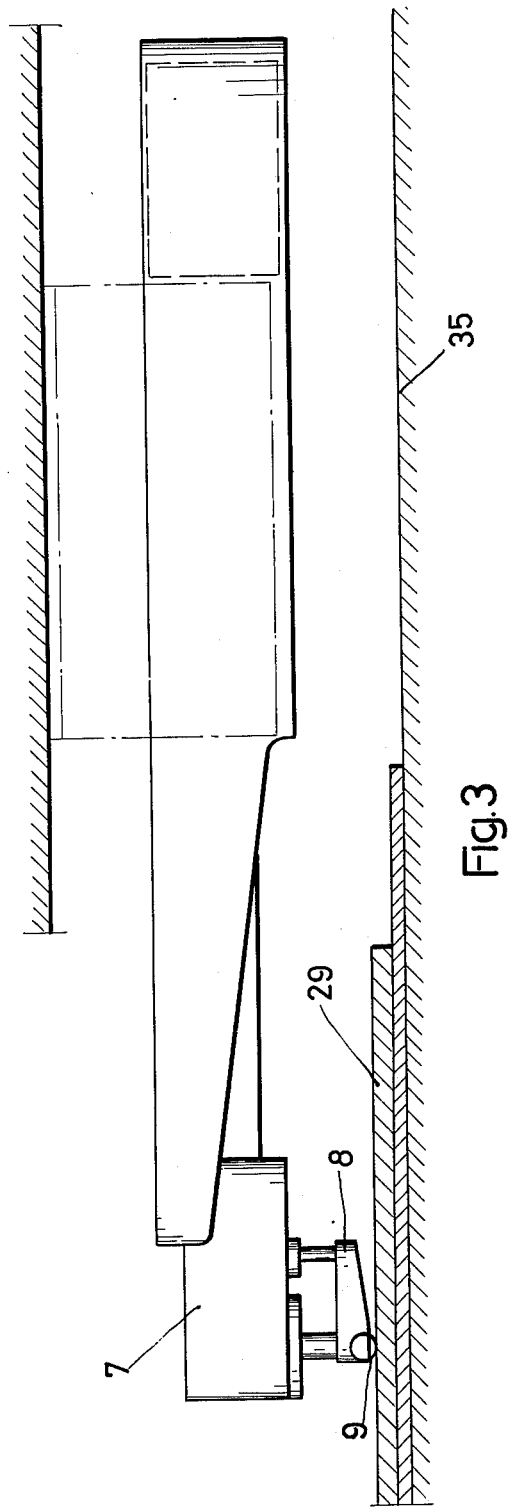

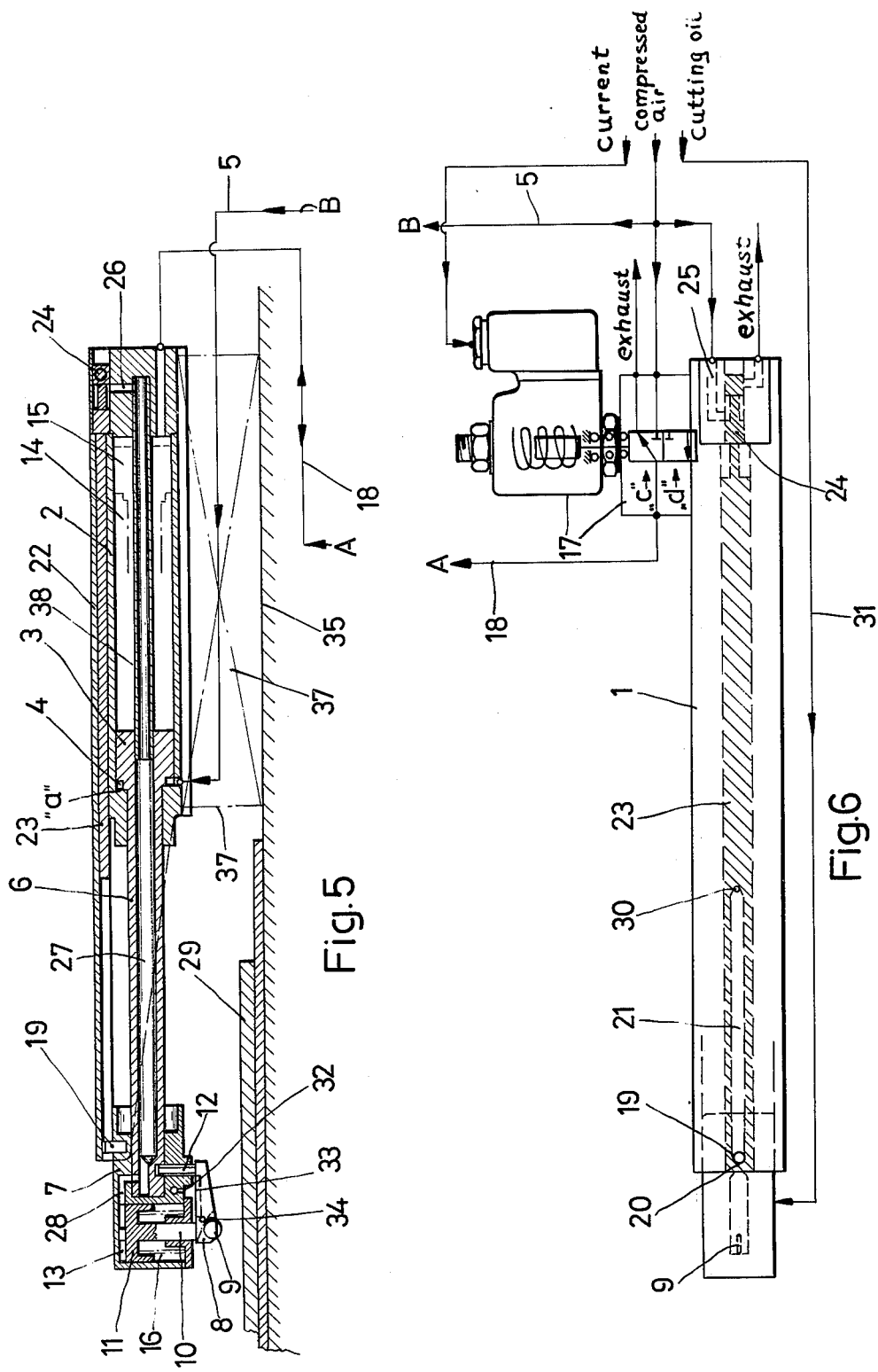

APPARATUS FOR MAKING RELIEF CUTS ON PREVIOUSLY SCORED GLASS SHEETS

BACKGROUND OF THE INVENTION

The invention relates to an apparatus for the application of rectilinear relief cuts to previously scored glass sheets, especially those having a curvilinear external contour, such as motor vehicle windowpanes or the like.

In the large-scale production of glass sheets, especially motor vehicle windowpanes, the cutting out or the preliminary scoring of the windowpane shape from suitably dimensioned, usually rectangular glass blanks is performed with automatic cutting machines in which, after the insertion of the blanks, a cutting wheel mounted in a cutting head is lowered onto the blank and is guided on a suitably shaped pattern. At the end of the cutting process, the cutting wheel, which has returned to its starting position, is raised again. The scored blank is carried from the automatic cutting machine by means of a roller conveyor or other transporting means to a breaking station in which the marginal waste portion is then broken off.

If the windowpane shapes are suitably simple, the breaking off of the marginal waste can be performed automatically by machine. Certain windowpane shapes, however, especially windshields, back windows and specially shaped side windows of motor vehicles, when they have curvilinear or arcuate edges, cannot be broken out in this manner. Instead, one or more relief cuts must be made at suitable places on the marginal waste portion to prevent damaging the outlined windowpane.

Hitherto the relief cuts have been made by an operator using a manual glass cutter, after which the margin is then broken away by hand. The making of the relief cuts requires the special attention of an experienced operator, because the start of the relief cut must be located precisely at the outer contour of the windowpane which has been scored by the automatic cutting machines. If the cut is made too far from the machine-scored line, projecting sharp points often develop when the marginal waste is broken away, which then have to be ground off. But if the cut begins inside of the machine-scored windowpane contour, the windowpane becomes useless, because this scratch is the starting point for later cracking of the glass during hardening or under bending stresses after installation in the motor vehicle.

The fact that an experienced operator is required in order to make the relief cuts by hand results in relatively high production costs. Also, the quality of the windowpanes produced will vary according to the care which the workman actually exercises.

THE INVENTION

The invention is addressed to the problem of creating an apparatus of the kind described in the beginning, which permits the automatic breaking away of the marginal waste even in the case of windowpane shapes which have not been suitable hitherto for such an operation.

In accordance with the invention, this problem is solved by an apparatus of the initially described kind, which is characterized by an elongated beam extending above the previously scored glass pane and supported alongside the latter on the table of an automatic cutting machine or the like; a horizontal, pressure medium operated cylinder and piston unit which is disposed on the beam and which, in the extended position, extends substantially over the entire length thereof to advance the cutting wheel to a starting position adjacent the previously scored outer contour of the pane, and then to effect the relief cut; a cutting head which bears the cutting wheel and can be displaced horizontally by the horizontal cylinder and piston unit; a vertical, pressure medium operated cylinder and piston unit disposed in the cutting head for raising the cutting wheel out of its working position and lowering same into its working position, and a control system for the controlled, automatic operation of the cylinder and piston units.

A preferred embodiment of the invention is characterized by the fact that the cylinder and piston units are pneumatically operated, which permits the apparatus to be manufactured at especially low cost.

In further development of the invention it is proposed that the horizontal cylinder and piston unit be provided with a differential piston which is constantly biased by the pressure medium into its withdrawn position, it being possible furthermore to provide the differential piston and its piston rod carrying the cutting head at its free end with a longitudinal axial bore communicating at its one end with the cylinder chamber of the vertical cylinder and piston unit on the side of the piston facing away from the cutting wheel, and at its other end with a valve controlling the compressed air feed through a tube feeding the compressed air to the vertical cylinder and piston unit, which tube is centrally disposed in the cylinder chamber of the horizontal cylinder and piston unit and enters slidingly into the longitudinal bore.

This embodiment can be improved still further by providing the control system with a magnetic valve for feeding compressed air to the horizontal cylinder and piston unit. It may be desirable for the control valve to be operable by a connecting rod lying parallel to the differential piston and capable of limited longitudinal displacement, which has two stops disposed in spaced-apart relationship for limiting the movement of an actuating member affixed to the piston rod, the connecting rod being able to have an elongated slot engaged by a pin disposed on the piston rod.

The apparatus of the invention creates for the first time the possibility of relieving the operator from the necessity of making the relief cuts and from the work of breaking off the marginal waste, and even makes it possible to dispense with such an operator. The automatic scoring apparatus of the invention for making the relief cuts permits the automatic breaking off of the marginal waste also from windowpanes of shapes which have hitherto been unsuitable for the purpose, since the cuts can be placed precisely, without intervention by an operator, at the outer contour of the pane which has previously been scored according to the pattern that was provided.

The scoring apparatus of the invention can be made so small and compact that it is not only suitable for automatic glass cutting machines which are to be newly constructed, but it can also be retrofitted to machines of this kind which are already in use. The apparatus can be fastened either to the cutting table of the automatic cutting machine or, if this interferes with the insertion of the blanks, it can be mounted overhead on the structure holding the pattern. Preferably, the apparatus of the invention will have a flexible connecting cable containing the necessary hoses and lines for compressed air, electricity and cutting oil, which can be connected to an appropriately disposed terminal.

The manner of operation of the new apparatus is the same in principle as that of the automatic cutting machine. The cutting wheel, which in the rearward starting position is in the raised position, is first advanced to the forward position which is fixed by a stop and has been precisely established by the rotatable and displaceable holding means.

Then the cutting wheel is lowered onto the glass, drawn rearwardly by the operation of the horizontal cylinder and piston unit, and, after the rear stop has been reached and the vertical cylinder and piston unit has been dumped, is lifted away by means of a spring which biases the piston of the vertical cylinder and piston unit into its withdrawn position raising the cutting wheel out of its working position. The backward and forward movement of the cutting wheel is controlled by a magnetic valve (3/2-way valve), while the upward and downward movement is performed by means of a mechanically operated control valve, as it will be understood from the description that follows of the preferred embodiment of the invention.

Additional features and advantages of the invention will be seen in the claims and in the following description in which an embodiment of the invention is explained in detail with the aid of the drawings, wherein FIG. 1 is an elevational view of the apparatus of the invention in the starting position, the method by which it is fastened on the table being indicated by broken lines;

FIG. 3 is a side elevational view of the apparatus, corresponding to FIG. 1, showing the cutting wheel advanced and lowered onto the glass at the beginning of the rearward movement, the method by which it is mounted on the overhead cutting pattern holder being indicated by broken lines;

FIG. 5 is a longitudinal cross sectional view taken through the apparatus of the invention showing the advanced cutting head before the descent of the cutting wheel; and FIG. 6 is a top plan view corresponding to FIG. 5, the letters A and B in FIGS. 5 and 6 indicating the connection points for the lines diagrammatically connecting the figures.

Figure 2:
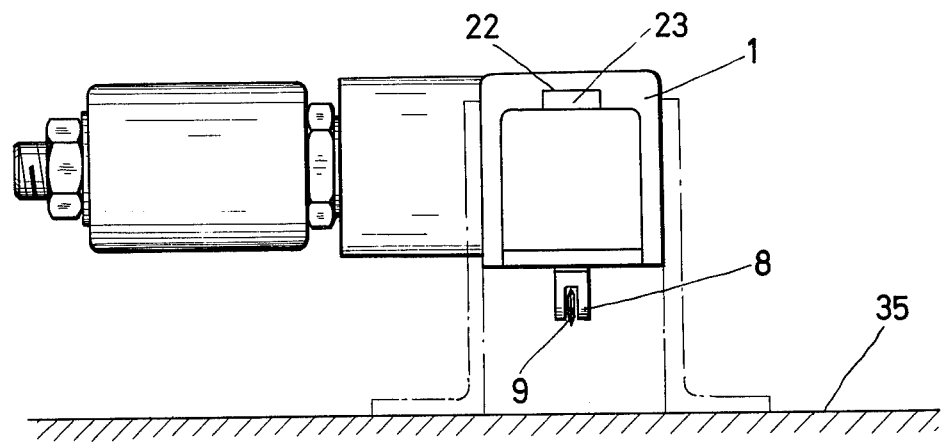
FIG. 2 is an end elevational view of FIG. 1.

With reference, now, to the drawing, the scoring apparatus in the preferred embodiment represented has a channel-shaped beam 1 to which a compressed-air jack cylinder 2 is affixed, in which a differential piston 3 is disposed for sliding movement and is constantly biased by compressed air fed to cylinder end 4 through line 5 into its withdrawn position, and which transmits its movement through a piston rod 6 to a cutting head 7. The cutting head 7, which bears against the beam 1, has a cutting wheel holder 8 having a cutting wheel 9 mounted therein, which is connected by a piston rod 10 to a piston 11 of a vertical cylinder and piston unit which is also compressed-air operated. The cutting wheel holder 8 is secured against canting by a straight guiding means 12. The working cylinder chambers are identified by the reference numbers 13 and 14. While the differential piston 3 of the horizontal cylinder and piston unit is acted upon by compressed air on both sides, the piston 11 operating the cutting wheel holder 8 is biased by a return spring 16 into the upper position, shown in FIG. 5, in which the cutting wheel 9 is raised from the glass.

The operation of the scoring apparatus is controlled by a magnetic valve 17 which can supply compressed air to the cylinder chamber 14 of the horizontal cylinder and piston unit through a line 18. The magnetic valve is a 3/2-way valve which, when shifted from position $d$ shown in the drawing, enters into position $c$. When the cutting head has been brought to its forward position, in which the front face of the piston is in contact with the stop edge $a$ on cylinder 2, the magnetic valve 17 is returned to position $d$ by a return spring after a time delay controlled by a time-delay relay, thereby releasing the air from the cylinder chamber 14 so that the cutting head is drawn rearwardly, thus making the relief cut. In the meantime, the cutting head with the cutting wheel holder 8 and the cutting wheel 9 has been lowered onto the glass in the manner to be described below.

A pin 19 provided on the cutting head or on the piston rod 6 engages a slot 21 in a connecting rod 23 which operates a compressed-air control valve 24 which, when pin 19 encounters the forward end 20 of the slot 21, comes into the position shown in FIGS. 5 and 6, for example. By means of the control valve 24, compressed air is delivered in a controlled manner through passages 25, 26, 27 and 28 to the cylinder chamber 13, so that the cutting wheel 9, upon being drawn rearwardly from the position shown in FIG. 3 into the position shown in FIG. 1, provides the glass 29 with the relief cut. The rearward end 30 of the slot 21 serves for the operation of the control valve 24 to lift the cutting wheel 9 upon completion of the relief cut.

Figure 4:
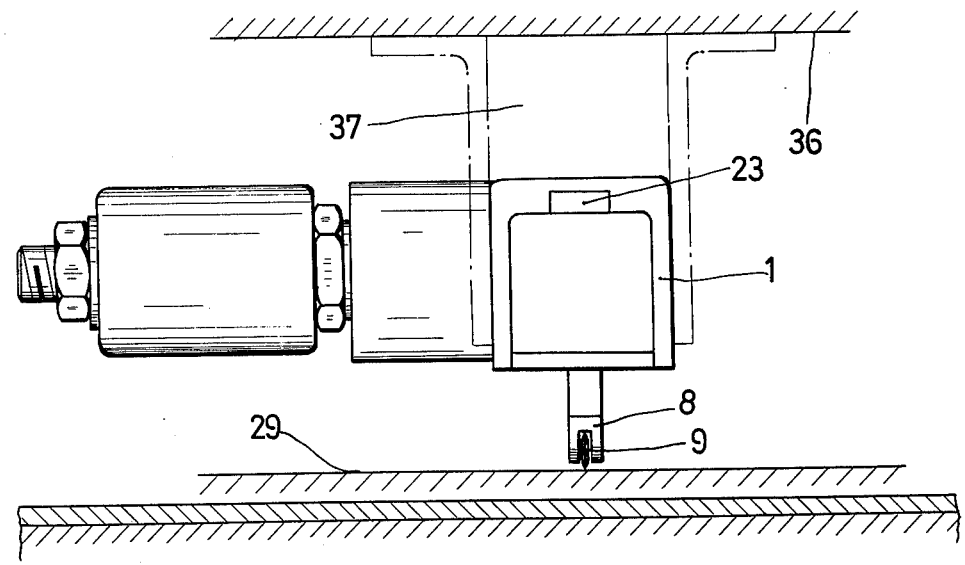
FIG. 4 is an end elevational view of FIG. 3.

The cutting oil that is needed for the cutting operation is fed through a line 31 to the cutting head 7, drips through a bore 32 into a felt-filled recess 33, and is delivered through a bore 34 to the cutting wheel 9. The scoring apparatus of the invention can be fastened to the cutting table 35 of the automatic cutting machine, as shown in FIGS. 1 and 2 for example, by means of a slotted angle iron; as an alternative, FIG. 4 shows the scoring apparatus fastened to the mounting of the cutting pattern 36. An especially simple and rapid alignment and fastening means is afforded by the use of a permanent electromagnetic bar 37 whose exciter coil, when energized, neutralizes the magnetic field at the contact face and thus permits removal and alignment. An especially advantageous feature of the invention is to be seen herein.

The passage 27 consists of an axial longitudinal bore through the differential piston 3 and piston rod 6, which bore communicates with the control valve 24 through a feed tube 38 which fits slidingly into the longitudinal bore 27.

The scoring apparatus of the invention operates as follows.

In the starting position, illustrated in FIG. 1, the cylinder chambers 13 and 14 are not under pressure. The piston 3, under the action of the cylinder end 4 which is constantly under pressure, is in the position 15 indicated in broken lines in FIG. 5, while the cutting wheel holder 8 with cutting wheel 9 is held in the raised position indicated in FIG. 5 by the action of the return spring 16.

To actuate the scoring apparatus, the magnetic valve 17 is energized thereby delivering compressed air to the cylinder chamber 14 through line 18, so that the differential piston 3 is moved forward by the differential effect and brings the cutting head 7 into the forward position shown in FIG. 5. Shortly before reaching the end position, the pin 19 provided on piston rod 6 or on the cutting head 7 abuts against the forward end 20 of the slot 21, thereby moving the connecting rod 23 forwardly in its guiding means 22 and bringing the control valve 24 into the position shown in FIGS. 5 and 6.

The cylinder chamber 13 is thereby fed compressed air through the passages 25, 26, 27 and 28, so that the piston 11, overcoming the pressure of the return spring 16, moves the cutting wheel holder 8 downwardly and places the cutting wheel on the glass workpiece, this position being represented in FIG. 3.

After the cutting wheel has made contact with the glass workpiece, the magnetic valve 17 is de-energized by the action of an adjustable time-delay relay and discharges the pressure from cylinder chamber 14, so that the cutting head is drawn rearwardly by the pressure that is being constantly applied in cylinder end 4, and the cut is executed, completing the transition between the horizontal positions of cutting head 7 which are shown in FIGS. 3 and 1. Shortly before the rearward end position is reached, pin 19 encounters the end 30 of slot 21 in connecting rod 23 and returns the control valve 24 to its starting position, thereby discharging the air from the cylinder chamber 13 of the vertical cylinder and piston unit. Accordingly, the cutting wheel is raised again under the action of the return spring 16, thus restoring the starting condition represented in FIG. 1.

All of the above-described actions are controlled entirely automatically by the corresponding control systems.

The features of the invention disclosed in the above description, in the drawing and in the following claims can be important both individually and in any desired combination for the realization of the invention in its various embodiments.

What we claim is:

1. An apparatus for making relief cuts on pre-scored glass sheets, comprising: elongated support means, first cylinder and piston means supported by said support means, cutting head means reciprocable by said first cylinder and piston means along said elongated support means in a first plane, a cutting roller carried by said cutting head, second cylinder and piston means arranged at said cutting head for moving said cutting roller relative to said support means in a plane substantially perpendicular to said first plane, and means for controlling said first and second cylinder and piston means, whereby said cutting roller is adapted to be moved into a starting position adjacent the pre-scored sheet by said first cylinder and piston means moving in one direction in said first plane, said roller moved to a cutting position by said second cylinder and piston means, and said sheet relief-cut by said cutting roller in said cutting position during movement of said first cylinder and piston means in said first plane in a direction opposite to said one direction.

2. An apparatus according to claim 1, which includes means for pneumatically controlling said first and second cylinder and piston means.

3. An apparatus according to claim 1, which comprises means for biasing said piston of said first cylinder and piston means in a direction opposite to said one direction, to thereby bias said first cylinder and piston means into a withdrawn position, said biasing means being pressure medium operable.

4. An apparatus according to claim 3, wherein said first cylinder and piston means comprises a piston rod connected at one end to said piston of said first cylinder and piston means and at the other end to said cutting head means, said piston rod and said piston being provided with longitudinal passage means, said second cylinder and piston means comprising a chamber located on that side of the piston thereof which faces away from said cutting roller and communicating with said passage means, said first cylinder and piston means having a chamber, conduit means located in said last-mentioned chamber and having one end slidably received in said passage means, said control means including control slide means arranged adjacent the other end of said conduit means, for admitting a pressure medium through said conduit means and said passage means to said chamber in said second cylinder and piston means.

5. An apparatus according to claim 4, wherein said control means comprises magnetically operable valve means for admitting a pressure medium to set first cylinder and piston means.

6. An apparatus according to claim 4, which comprises a connecting rod operatively connected to said control slide means, said rod being reciprocable and located substantially parallel to said first cylinder and piston means, actuating means operably connected with said piston rod, and stop means arranged in spaced relationship to each other on said connecting rod for abutment by said actuating means.

7. An apparatus according to claim 6, wherein said connecting rod is provided with a longitudinal slot and wherein said actuating means comprises a pin connected to said piston rod, the ends of said slot forming said stop means.

8. An apparatus according to claim 1, wherein said second cylinder and piston means comprises spring means for biasing the piston of said second cylinder and piston means in a direction away from the glass sheet to be cut.

9. An apparatus according to claim 1, wherein said cutting roller is connected to the piston of said second cylinder and piston means, and guide means for vertically guiding said piston of said second cylinder and piston means and for preventing rotation of said last mentioned piston.

10. An apparatus according to claim 1, which comprises a machine frame, permanent electro-magnetic means for detachably connecting said support means to said frame, said magnetic means comprising a neutralizing exciter coil, said support means being detachable from said frame upon actuation of said exciter coil.

11. An apparatus according to claim 1, which comprises conduit means for feeding cutting oil to said cutting roller.

12. An apparatus according to claim 1, which comprises a combined conduit for feeding electric current, a medium under pressure and cutting oil to said apparatus.

* * * * *